United States Patent Office 3,267,112
Patented August 16, 1966

3,267,112
NOVEL IMIDAZOTHIAZOLE DERIVATIVES AND
A PROCESS FOR PREPARATION THEREOF
Issei Iwai and Tetsuo Hiraoka, Tokyo, Japan, assignors to
Sankyo Company, Limited, Chyuo-ku, Tokyo, Japan
No Drawing. Filed Feb. 24, 1965, Ser. No. 435,036
Claims priority, application Japan, Feb. 29, 1964,
39/11,145
6 Claims. (Cl. 260—305)

The present invention relates to novel imidazothiazole compounds and acid-addition salts thereof. It relates to a novel process for preparing them. More particularly, the present invention relates to novel imidazothiazole compounds having the formula

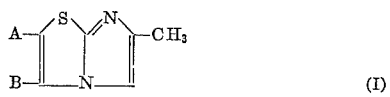

wherein A and B each represent hydrogen or A and B may be combined together with carbon atoms in which they are attached to form phenyl group unsubstituted or substituted with alkyl group containing from 1 to 5 carbon atoms, alkoxy group containing from 1 to 5 carbon atoms, halogen or nitro group and acid-addition salts thereof. It further relates to a novel process for preparing them.

The imidazothiazole compounds having the above Formula I and acid-addition salts thereof are novel compounds unknown in the prior art and possess potent anti-inflammatory, analgesic and antihypertensive activities.

It is an object of the present invention to provide novel imidazothiazole compounds having the above Formula I and acid-addition salts thereof useful as anti-inflammatory, analgesic and antihypertensive agent.

Another object of the present invention is the provision of a new process for preparing the said compounds.

Other objects of the present invention will be apparent from the following detailed description.

As a result of numerous studies concerning the reaction between a compound containing a triple bond and a heterocyclic compound, it has now been discovered that a compound with fused thiazole and imidazole is easily formed by a reaction of a thiazole compound containing an amino group at the 2-position in the thiazole ring with a halogenated aliphatic hydrocarbon containing a triple bond in the molecule followed by a reaction with alkalimetal alcoholates or alkalimetal amide.

The process for preparing novel imidazothiazole compounds having the above Formula I according to the present invention is based upon the above-mentioned discovery.

According to the process of the present invention, the imidazothiazole compounds having the above Formula I may be prepared by reacting a thiazole compound having the formula

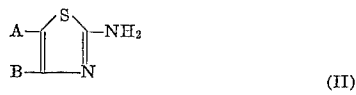

wherein A and B have the same meanings as set forth above with propargyl halide to produce a hydrohalide of the thiazoline compound having the formula

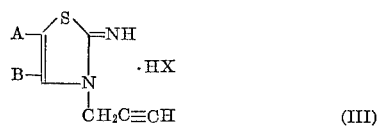

wherein X represents halogen, and A and B have the same meanings as set forth above, and reacting the latter compound with alkalimetal alcoholates or alkalimetal amides.

In carrying out the process according to the present invention, the first step in the process may be carried out by reacting a thiazole compound having the above Formula II with propargyl halide in a suitable organic solvent. Such organic solvent to be preferably employed includes lower alkyl alcohols, for example, methanol, ethanol, n- or iso-propanol, butanol, amyl alcohol and the like, but other commercially available organic solvents such as benzene, toluene or ethers, for example, dimethylether, ethylether or dioxane may also be satisfactorily employed in the first step. And, it is preferred to employ the above solvent being free of water. The reaction temperature and reaction time are not significantly critical, but generally the first step may be carried out by heating the reactants at the neighborhood of about 80° C. for from about 5 to about 10 hours. After completion of the reaction, the product in the first step generally precipitates in situ, and then the product may be recovered by a conventional method, for example, by filtration. The hydrohalides having the above Formula III may be applied to the subsequent second step of the present process, either as such or, if desired, after purification by a conventional method, for example, by recrystallization from such suitable solvent as methanol or ethanol.

The propargyl halide to be employed in the above first step may be any propargyl halide such as propargyl bromide, propargyl chloride or propargyl iodide, but practically, propargyl bromide may be advantageously used.

The second step in the process according to the present invention involves reacting the hydrohalide obtained in the above-mentioned first step with an alkalimetal alcoholates or an alkalimetal amide.

Examples of alkalimetal alcoholates to be employed in the second step include sodium methoxide, sodium ethoxide, sodium t-butoxide and potassium t-butoxide.

Examples of alkalimetal amides to be employed in the second step include sodium amide and potassium amide.

In the case where an alkalimetal alcoholate is employed, the reaction of the above second step may be conducted by reacting the hydrohalide having the above Formula III with an alkalimetal alcoholate in the presence of an anhydrous organic solvent such as absolute methanol, absolute ethanol, absolute n- or iso-propanol or absolute amyl alcohol. Usually, an alkalimetal alcoholate is added to the reaction system in the form of a solution previously prepared from the corresponding alkalimetal and alcohol. The reaction temperature and reaction time are not critical, but the reaction may usually be carried out at a reflux temperature of the anhydrous organic solvent being used for from about 1 to about 3 hours. After completion of the reaction, the product may be recovered from the reaction mixture by any of the conventional methods, for example, by addition of water to the reaction mixture followed by extraction with a suitable organic solvent.

In the case where an alkalimetal amide is employed, the reaction of the above second step may be conducted by reacting the hydrohalide having the above Formula III with an alkalimetal amide in the presence of an anhydrous organic solvent such as anhydrous ethylether, anhydrous dimethylether, anhydrous dioxane, anhydrous benzene or anhydrous toluene or liquid ammonia, preferably in the presence of liquid ammonia. When liquid ammonia is used as a solvent, it is advantageous to use an alkalimetal amide solution previously prepared from the corresponding alkalimetal and liquid ammonia and in this case the second step may be carried out under cooling, for example, at a temperature range from about −40° C. to about −70° C. in the same way as in the known reaction by employment of liquid ammonia. When an anhydrous organic solvent is used as a solvent, it is desirable that an alkalimetal amide is first prepared from the corresponding alkalimetal and liquid ammonia followed by employment of such amide in the reaction and in this case the reaction temperature and reaction time are not critical, but usually the reaction may be carried out at room temperature or reflux temperature of the solvent being used for from about 1 to about 3 hours. After completion of the reaction, the product may be recovered from the reaction mixture by any of the conventional methods, for example, by addition of ammonium chloride to the reaction mixture followed by extraction with a suitable organic solvent.

The following compounds are representative of those contemplated by the present invention and which may be prepared by the procedure described hereinabove.

6-methyl-imidazo[2,1-b]thiazole;
2-methyl-imidazo[2,1-b]benzothiazole;
2-methyl-7-methoxy-imidazo[2,1-b]benzothiazole;
2-methyl-7-methyl-imidazo[2,1-b]benzothiazole;
2-methyl-7-chloro-imidazo[2,1-b]benzothiazole;
2-methyl-7-nitro-imidazo[2,1-b]benzothiazole;
2,5,7-trimethyl-imidazo[2,1-b]benzothiazole;
2-methyl-5-bromo-7-methyl-imidazo[2,1-b]benzothiazole;
2-methyl-5,7-dichloro-imidazo[2,1-b]benzothiazole;
2-methyl-5,7-dinitro-imidazo[2,1-b]benzothiazole.

According to the process of the present invention, the imidazothiazole compounds having the above Formula I obtained as described above may be converted to the corresponding acid-addition salts in a conventional manner by treating with acid such as mineral acid, for example, sulfuric acid, nitric acid or phosphoric acid hydrohalic acid, for example, hydrochloric acid, hydrobromic acid or hydroiodic acid organic acid, for example, acetic acid, oxalic acid, tartaric acid or succinic acid.

The following examples serve to illustrate but are not intended to limit the scope of the present invention.

*Example 1.—Preparation of 6-methyl-imidazo[2,1-b]thiazole*

A mixture of 14 g. of 2-aminothiazole, 16.7 g. of propargyl bromide and 65 ml. of absolute ethanol is heated at 80° C. on a water bath for 7 hours. After completion of the reaction, the ethanol is distilled off from the reaction mixture under reduced pressure and the residue is dissolved in water to make an aqueous solution. The aqueous solution is extracted with ether and the ether extract is discarded. The water is removed from the aqueous layer by distillation under reduced pressure to give 29 g. of a crystalline material which is recrystallized from absolute ethanol to give 20.5 g. of the hydrobromide of 2-imino-3-(2-propynyl)thiazoline, melting at 161–162° C.

To a mixture of 2.19 g. of the hydrobromide obtained as described above and 30 ml. of absolute ethanol is added a solution of 1.5 g. of metallic sodium in 30 ml. of absolute ethanol. The resulting mixture is heated under reflux for 2 hours. After completion of the reaction, the reaction mixture is poured into water. The aqueous mixture thus obtained is saturated with potassium carbonate followed by extraction with ether. The ether extract is dried over anhydrous sodium sulfate, the ether is distilled off and the residue is subjected to vacuum distillation, thereby 0.94 g. of 6-methyl-imidazo[2,1-b]thiazole being obtained with a boiling point of 81–85° C. (the bath temperature) at 0.15 mm. Hg.

The picrate of the product thus obtained has a melting point of 203–204° C.

*Analysis.*—Calculated for $C_{12}H_9N_5O_7S$ (as picrate): C, 39.24; H, 2.47; N, 19.07. Found: C, 39.37; H, 2.47; N, 19.03.

*Example 2.—Preparation of 2-methyl-imidazo[2,1-b]benzothiazole and hydrobromide thereof*

A mixture of 15 g. of 2-amino benzothiazole, 11.9 g. of propargyl bromide and 60 ml. of absolute ethanol is heated on a water bath at 80° C. for 7 hours. After completion of the reaction, the precipitate separated in the reaction mixture is recovered by filtration to obtain 12 g. of the crude substance melting at 208–209° C., and then the crude substance thus obtained is recrystallized from absolute ethanol to give 9 g. of the hydrobromide of 2-imino-3-(2-propynyl)benzothiazoline, melting at 219–220° C.

To a suspension of 0.5 g. of the hydrobromide obtained as described above in 20 ml. of absolute ethanol is added a solution of 1 g. of metallic sodium in 20 ml. of absolute ethanol. The resulting mixture is heated under reflux for 2 hours. After completion of the reaction, the reaction mixture is poured into water. The aqueous mixture thus obtained is extracted with ether. The ether extract is dried over anhydrous sodium sulfate and the ether is distilled off to give 0.34 g. of the crystalline residue, which is recrystallized from n-hexane to yield 0.13 g. of 2-methyl-imidazo[2,1-b]benzothiazole, melting at 89–90° C.

*Analysis.*—Calculated for $C_{10}H_8N_2S$: C, 63.80; H, 4.28; N, 14.80. Found: C, 63.27; H, 4.29; N, 15.07.

To 4 g. of 2-methyl-imidazo[2,1-b]benzothiazole is added 24 ml. of hydrobromic acid solution (d=1.48) and then the resulting mixture is evaporated to dryness under reduced pressure at a room temperature to remove excess HBr and water. The crystalline residue is recrystallized from absolute ethanol to give 4.8 g. of 2-methyl-imidazo[2,1-b]benzothiazole hydrobromide, melting at 284–286° C.

*Example 3.—Preparation of 2-methyl-imidazo[2,1-b]benzothiazole*

The same procedure as described in Example 2 is followed except that 30 g. of 2-amino benzothiazole is employed as a starting material. There is obtained 18 g. of the hydrobromide of 2-imino-3-(2-propynyl)benzothiazoline.

To a sodium amide solution prepared from 2 g. of metallic sodium and 100 ml. of liquid ammonia by a conventional method, is added 1 g. of the hydrobromide obtained as described above, while maintaining a temperature of −70° C. and then the resulting mixture is stirred for 2 hours at a temperature of −40° C. After completion of the reaction, 5 g. of ammonium chloride is added to the reaction mixture, ammonia is evaporated at a room temperature and water is added to the residue. The aqueous solution is extracted with ether. The ether extract is dried over anhydrous sodium sulfate, the ether is distilled off and the residue is recrystallized from n-hexane to give 0.25 g. of 2-methyl-imidazo[2,1-b]benzothiazole, which has a melting point of 89–90° C. and shows no depression in the melting point on admixture with the product obtained in Example 2.

The 2-methyl-imidazo[2,1-b]benzothiazole obtained as described above is converted to the corresponding hydrobromide in the same way as described in Example 2.

What is claimed is:

1. A compound selected from the class consisting of the compound having the formula

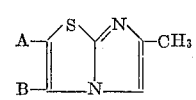

wherein A and B each represent hydrogen or A and B may be combined together with carbon atoms in which they are attached to form phenyl group unsubstituted or substituted with alkyl group containing from 1 to 5 carbon atoms, alkoxy group containing from 1 to 5 carbon atoms, halogen or nitro group and acid-addition salt thereof.

2. 6-methyl-imidazo[2,1-b]thiazole.

3. 2-methyl-imidazo[2,1-b]benzothiazole.

4. 2-methyl - imidazo[2,1-b]benzothiazole hydrobromide.

5. A process for preparing a compound having the formula

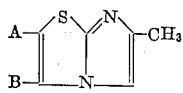

wherein A and B each represent hydrogen or A and B may be combined together with carbon atoms in which they are attached to form phenyl group unsubstituted or substituted with alkyl group containing from 1 to 5 carbon atoms, alkoxy group containing from 1 to 5 carbon atoms, halogen or nitro group which comprises reacting a compound having the formula

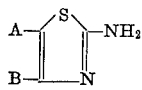

wherein A and B have the same meanings as set forth above with propargyl halide to produce a compound having the formula

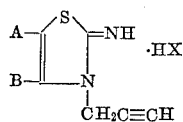

wherein X represents halogen, and A and B have the same meanings as set forth above and reacting the latter compound with an alkalimetal alcoholate or alkalimetal amide.

6. A process for preparing an acid-addition salt of the compound having the formula

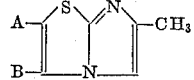

wherein A and B each represent hydrogen or A and B may be combined together with carbon atoms in which they are attached to form phenyl group unsubstituted or substituted with alkyl group containing from 1 to 5 carbon atoms, alkoxy group containing from 1 to 5 carbon atoms, halogen or nitro group which comprises reacting a compound having the formula

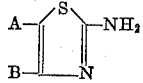

wherein A and B have the same meanings as set forth above with propargyl halide to produce a compound having the formula

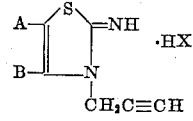

wherein X represents halogen, and A and B have the same meanings as set forth above and reacting the latter compound with an alkalimetal alcoholate or an alkalimetal amide followed by treatment with an acid.

No references cited.

HENRY R. JILES, *Acting Primary Examiner.*
ALTON D. ROLLINS, *Assistant Examiner.*